United States Patent [19]

Moser

[11] 3,768,015
[45] Oct. 23, 1973

[54] ELECTROLYTIC TIMING CELL
[75] Inventor: James R. Moser, Shrewsbury, Pa.
[73] Assignee: Catalyst Research Corporation, Baltimore, Md.
[22] Filed: Nov. 15, 1971
[21] Appl. No.: 198,829

[52] U.S. Cl. .............................. 324/182, 317/231
[51] Int. Cl. .......................... G04f 9/00, H01g 9/16
[58] Field of Search ........................... 324/182, 94; 317/230, 231

[56] References Cited
UNITED STATES PATENTS
3,679,945  7/1972  Sekido et al. ...................... 317/230
3,428,894  2/1969  Boettcher ...................... 324/182 X Primary Examiner—Alfred E. Smith
Attorney—Brown, Murray, Flick & Peckham

[57] ABSTRACT

An electrolytic timing cell utilizing three electrodes, one of which contains a very specific quantity of a plateable metal, the second of which acts as a dummy electrode through which current is passed causing a reduction of metal ions, and the third of which is a reference electrode in contact with the electrolyte and which acts as a stable voltage reference. An output signal indicative of the end of a timing period is derived between the first and third electrodes. The reference electrode stabilizes the timing circuit voltage so that a voltage change occurs only at the end of the timing sequence.

10 Claims, 3 Drawing Figures

PATENTED OCT 23 1973 3,768,015

ELECTROLYTIC TIMING CELL

BACKGROUND OF THE INVENTION

Electrolytic timing cells are now well known and comprise a pair of electrodes immersed in an electrolyte. One of the electrodes, the anode, is formed from an inert electrically conductive substrate which will not readily oxidize (e.g. gold or platinum). This substrate is plated with a precise amount of an oxidizable metal, such as silver, such that when a voltage is established across the two electrodes, an electrolytic plating action will occur with the oxidizable metal going into solution as ions which are plated on the cathode. This action will continue until all of the metal plated on the inert anode substrate has been removed, at which time the voltage across the two electrodes rises abruptly, indicating the termination of the plating action. Assuming a constant current source, a precise time period will elapse in plating the known, specified amount of metal. Consequently, such devices can be used as timing elements.

In the past, it has been common to sense the termination of the plating action and, hence, the termination of the timing interval by sensing a rise in voltage across the electrodes connected to the constant current source. Since, however, the voltage across such electrodes will vary due to cathodic polarization and thermodynamic and electrolyte impedance changes with changes in temperature, incorrect indication of a timing interval can result.

SUMMARY OF THE INVENTION

In accordance with the present invention, a new and improved electrolytic timing cell is provided which incorporates a third or reference electrode in contact with the electrolyte, usually positioned in close proximity to the anode between the two electrodes connected to a constant source.

Termination of the timing period is then derived from the potential difference between the reference electrode and the anode; with this arrangement the voltage variations of the prior devices are minimized and, for all practical purposes, eliminated. Since the cathode is not in the timer output circuit, the effect of cathode polarization and its change with temperature is eliminated; thermodynamic electrode potential changes are eliminated from the output current when the anode and reference electrode are made of the same metal. When plating on the cathode, dendrites are commonly formed so that a substantial spacing between the cathode and anode is required to prevent shorting by dendrites; the reference electrode, however, can be closely spaced from the anode thus greatly reducing the effect of change of impedance of the electrolyte solution.

DESCRIPTION OF THE PREFERRED EMBODIMENTS

Figure 1:
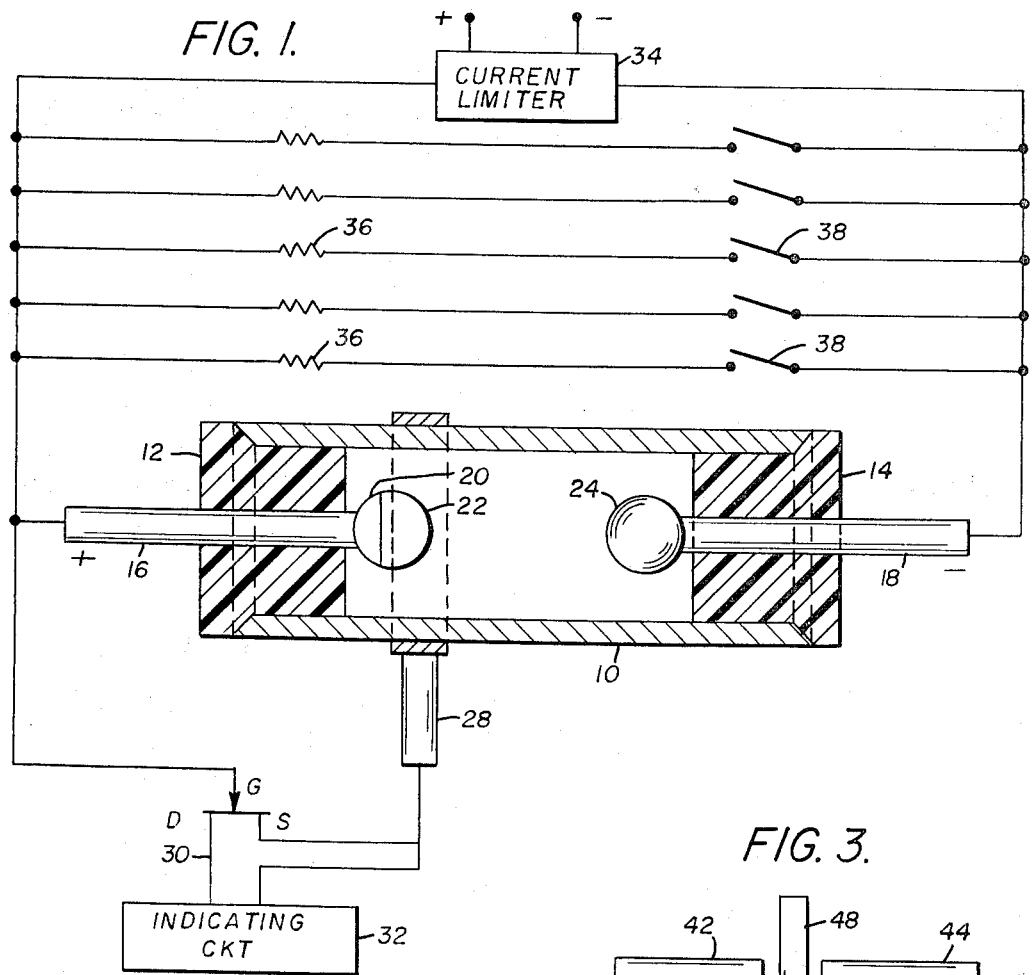
Figure 2:
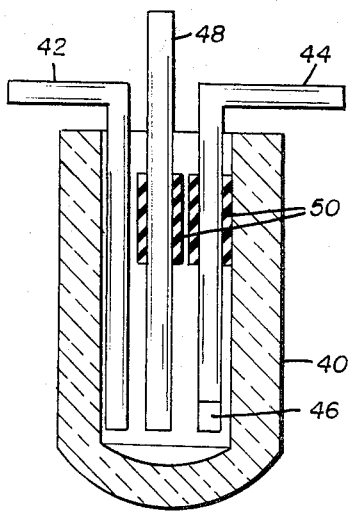
Figure 3:
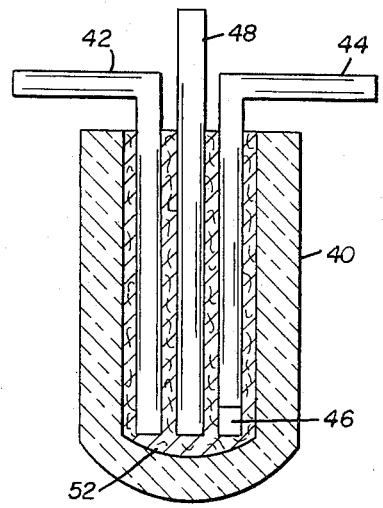

The above and other objects and features of the invention will become apparent from the following detailed description taken in connection with the accompanying drawings which form a part of this specification, and in which:

FIG. 1 is an illustration of one embodiment of the invention wherein the electrolytic cell is disposed within a stainless steel case and showing the external electrical circuitry connected to the cell;

FIG. 2 is an illustration of another embodiment of the invention wherein the electrolytic cell is disposed within a glass tube and the various electrodes are separated one from the other by means of rubber spacers; and FIG. 3 is an illustration of still another embodiment of the invention wherein the electrolytic cell is disposed within a glass tube and the various electrodes are separated one from the other by means of polypropylene wool.

With reference now to the drawings, and particularly to FIG. 1, the electrolytic cell shown includes an outer shell 10 of stainless steel having Teflon (trademark) plugs 12 and 14 inserted into its opposite ends. Extending through the Teflon plugs 12 and 14 are electrodes 16 and 18, respectively. The electrode 18 is preferably formed from silver; while the electrode 16 is formed from platinum or some other metal such as gold which is not readily oxidizable. Plated onto the forward, spherical end 20 of the electrode 16 is a layer 22 of silver. The space between the spherical ends 20 and 24 of the respective electrodes is filled with an electrolyte, such as a solution of silver nitrate in a glycol-water solvent. This electrolyte, an aliquot of the bulk which typically may comprise 5 milliliters of ethylene glycol, 5 milliliters of water, and 1 gram of $AgNO_3$, provides reliable and uniform operation over a wide temperature range of about $-40°$ C to $+75°$ C.

With the arrangement shown, it will be appreciated that when a potential is applied across the two electrodes 16 and 18 such that electrode 16 is positive with respect to electrode 18, the silver 22 plated on the electrode 16 will go into solution as ions; and these ions will be discharged at the cathode 18. This action will continue until all of the silver has been plated from the electrode 16; whereupon the potential between the electrodes will increase abruptly. This assumes that a constant current source is connected between the electrodes 16 and 18.

In the past, this abrupt increase in potential was detected and used to determine the termination of the timing period, which is that period required to remove all of the silver from the electrode 16. However, as was explained above, the impedance of the electrolyte will vary as a function of temperature, giving rise to possible false indications of the termination of the timing period. Furthermore, since a specific voltage was detected across the electrodes 16 and 18 in prior art devices in order to determine the termination of the timing period, a narrower range of timing intervals must be used. A restricted current intensity must be used, so that the IR voltage drop through the electrolyte would not give a false output signal that would terminate the timing interval.

In accordance with the present invention, the aforementioned difficulties of prior art devices are obviated by the use of a third or reference electrode 28 which is connected to the stainless steel case 10 at one point between the electrodes 16 and 18. It will be appreciated that if, for example, a potential of 10 volts is established between the electrodes 16 and 18 with the electrode 18 at zero volt (i.e., grounded), there will be a voltage drop between the two electrodes. That is, if one progresses from left to right from the electrode 16 to the electrode 18, the instantaneous voltage at spaced points in the electrolyte will decrease from 10 volts to zero volts. The electrodes 16 and 18 are connected to a constant current power source through an internally biased FET transistor 30. Connected between the source and drain electrodes of the field effect transistor 30 is an indicating circuit 32 which will indicate the end of the timing period when the voltage rises between the two electrodes 16 and 28. During the plating action, the electrodes 16 and 28 will be at essentially the same potential and are connected to a very high impedance output circuit causing essentially no current to flow between them. The voltage on electrode 28 will thermodynamically change to keep the voltage difference between electrodes 16 and 28 at zero and the voltage change due to the electrolyte impedance change with temperature will be minimized by keeping these two electrodes in close proximity to each other.

When, however, all of the silver on electrode 16 has been removed at the termination of the timing period, the potential on electrode 16 will increase rapidly and a large potential difference will exist between the two electrodes 16 and 28, causing the field effect transistor 30 to conduct whereby the indicating circuit 32 will indicate the termination of the plating period.

The input to the timing cell is through a current limiter 34 which provides an essentially constant current source between the electrodes 16 and 18. Connected between the electrodes 16 and 18 are parallel current paths each including a resistor 36 and a switch 38. When any one or more of the switches 38 are closed, the current between the two electrodes 16 and 18 can be varied to thereby vary the timing period.

In FIG. 2, another embodiment of the invention is shown which operates on the same principle as that of FIG. 1. In this case, however, the electrodes are carried within a glass capsule 40 filled with an electrolyte. The reference electrode 48 is formed from silver, and the anode 44 is formed from platinum, gold or some other non-easily oxidizable metal plated at its lower end with a layer of silver 46. The cathode or reference electrode 42 is again formed from silver and is intermediate the other two electrodes 42 and 44. Rubber spacers 50 are utilized to separate the electrodes and insulate them one from the other.

In FIG. 3, still another embodiment of the invention is shown wherein elements corresonding to those of FIG. 2 are identified by like reference numerals. In this case, however, the electrodes are maintained out of contact with each other by means of polypropylene wool 52 disposed between the electrodes. This wool, however, is porous in order to accommodate the electrolyte which is again held within the glass capsule 40.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. An electrolytic timing cell comprising a container, an electrolyte disposed within said container, first and second electrodes disposed within said electrolyte, the first of said electrodes being formed from a metal which does not easily oxidize and having a plating of an oxidizable metal thereon, means for establishing a potential between said electrodes to cause the plated metal on said first electrode to go into solution in the electrolyte as ions and become plated on the second electrode, a third electrode in electrical contact with said electrolyte, and means connected between said third and first electrodes for producing an electrical signal when all of the metal plated on said one electrode has been removed therefrom.

2. The timing cell of claim 1 in which the third electrode is positioned between the first and second electrodes.

3. The timing cell of claim 2 in which the third electrode is of the same metal as the oxidizable metal plating.

4. The timing cell of claim 1 wherein said container is formed from a metal to which said third electrode is connected, and means for insulating said container and said third electrode from said first and second electrodes.

5. The timing cell of claim 1 wherein said container is formed from dielectric material and said electrodes extend into the container.

6. The timing cell of claim 5 wherein said electrodes are insulated one from the other by rubber spacers.

7. The timing cell of claim 3 wherein said electrodes are insulated one from the other by polypropylene wool.

8. The timing cell of claim 1 wherein said first and third electrodes are connected to the gate and source electrodes of a field effect transistor.

9. The timing cell of claim 1 including a constant current source connected to said first and second electrodes.

10. The timing cell of claim 9 including a plurality of impedance elements adapted to be connected across said first and second electrodes, and switch means for selectively connecting said impedance elements across said first and second electrodes.

* * * * *